(12) United States Patent
Li et al.

(10) Patent No.: US 10,126,858 B2
(45) Date of Patent: Nov. 13, 2018

(54) TOUCH DISPLAY DEVICE AND TOUCH METHOD THEREOF

(71) Applicant: BOE TECHNOLOGY GROUP CO., LTD., Beijing (CN)

(72) Inventors: Wenbo Li, Beijing (CN); Yingyi Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 146 days.

(21) Appl. No.: 15/115,082

(22) PCT Filed: Nov. 6, 2015

(86) PCT No.: PCT/CN2015/094022
§ 371 (c)(1),
(2) Date: Jul. 28, 2016

(87) PCT Pub. No.: WO2016/206279
PCT Pub. Date: Dec. 29, 2016

(65) Prior Publication Data
US 2017/0108977 A1 Apr. 20, 2017

(30) Foreign Application Priority Data
Jun. 25, 2015 (CN) ............... 201510359447

(51) Int. Cl.
G06K 9/00 (2006.01)
G06F 3/041 (2006.01)
G06F 3/044 (2006.01)

(52) U.S. Cl.
CPC ............ G06F 3/0416 (2013.01); G06F 3/044 (2013.01); G06K 9/001 (2013.01); G06K 9/0002 (2013.01); G06K 9/0008 (2013.01)

(58) Field of Classification Search
CPC ....... G06F 3/044; G06F 3/0416; G06K 9/001; G06K 9/0008; G06K 9/0002
See application file for complete search history.

(56) References Cited

U.S. PATENT DOCUMENTS 9,092,652 B2 * 7/2015 Marciniak ............ G06K 9/0008
9,336,428 B2 * 5/2016 Erhart ................ G06K 9/00053
(Continued)

FOREIGN PATENT DOCUMENTS

| CN | 1284706 A | 2/2001 |
| CN | 102156574 A | 8/2011 |

(Continued)

OTHER PUBLICATIONS

Chinese Office Action dated Dec. 5, 2017.

Primary Examiner — Chan Park
Assistant Examiner — Mia M Thomas
(74) Attorney, Agent, or Firm — Dilworth & Barrese, LLP.; Michael J. Musella, Esq

(57) ABSTRACT

A touch display device and a touch method thereof are provided. The touch display device includes a touch panel, a fingerprint collecting unit, a signal processing unit and a memory. The fingerprint collecting unit is connected with the touch panel, and the signal processing unit is connected with the touch panel and the memory. The touch method of the touch display device includes acquiring a fingerprint information set including M first fingerprint images by the fingerprint collecting unit; and inquiring M second fingerprint images matched with the M first fingerprint images in a preset information set according to the M first fingerprint images in the fingerprint information set in the memory by the signal processing unit, and acquiring S first control instructions corresponding to the M second fingerprint images from the memory.

19 Claims, 5 Drawing Sheets

(56) References Cited

U.S. PATENT DOCUMENTS

| | | | |
|---|---|---|---|
| 9,430,076 B2* | 8/2016 | Chen | G06F 3/0412 |
| 9,710,689 B2* | 7/2017 | Evans, V | G02F 1/13338 |
| 9,733,740 B2* | 8/2017 | Cho | G06F 3/0412 |
| 9,785,863 B2* | 10/2017 | Naruse | G06K 9/6203 |
| 9,900,422 B2* | 2/2018 | Lee | H04M 1/72563 |
| 9,971,925 B2* | 5/2018 | Setterberg | G06K 9/0002 |
| 2006/0138574 A1 | 6/2006 | Saito et al. | |
| 2009/0083847 A1* | 3/2009 | Fadell | G06F 21/316 |
| | | | 726/16 |
| 2014/0267030 A1* | 9/2014 | Wu | G06F 3/03547 |
| | | | 345/157 |
| 2014/0292666 A1* | 10/2014 | Shi | G06F 3/0416 |
| | | | 345/173 |
| 2014/0294259 A1* | 10/2014 | Lee | G06K 9/00013 |
| | | | 382/124 |
| 2015/0055057 A1* | 2/2015 | Huang | G02F 1/13338 |
| | | | 349/62 |
| 2015/0109214 A1* | 4/2015 | Shi | G06F 3/044 |
| | | | 345/173 |
| 2015/0177881 A1* | 6/2015 | Chen | G06F 3/044 |
| | | | 345/174 |
| 2015/0234510 A1* | 8/2015 | Chang | G06F 3/0412 |
| | | | 345/173 |
| 2015/0350605 A1* | 12/2015 | Price | G01N 33/526 |
| | | | 348/77 |
| 2016/0147113 A1* | 5/2016 | Chang | G02F 1/133528 |
| | | | 349/12 |
| 2016/0180141 A1* | 6/2016 | Sarve | G06K 9/00026 |
| | | | 382/124 |
| 2016/0188041 A1* | 6/2016 | Kim | G06F 3/044 |
| | | | 345/174 |
| 2016/0350574 A1* | 12/2016 | Weber | G06K 9/00026 |
| 2016/0379586 A1* | 12/2016 | Wu | G06F 3/044 |
| | | | 345/174 |
| 2017/0011209 A1* | 1/2017 | Chung | G06F 3/044 |
| 2017/0075447 A1* | 3/2017 | Zuo | G06F 3/0418 |
| 2017/0108977 A1* | 4/2017 | Li | G06F 3/0416 |
| 2017/0124370 A1* | 5/2017 | He | G06K 9/0012 |
| 2017/0160868 A1* | 6/2017 | Kim | G06F 3/0416 |
| 2017/0169271 A1* | 6/2017 | Setterberg | G06K 9/0002 |
| 2017/0344781 A1* | 11/2017 | Zhou | G06K 9/0002 |
| 2017/0344795 A1* | 11/2017 | Zhou | G06F 21/32 |
| 2018/0012057 A1* | 1/2018 | Cho | G06F 3/041 |
| 2018/0173920 A1* | 6/2018 | Jonsson | G06K 9/0002 |

FOREIGN PATENT DOCUMENTS

| | | |
|---|---|---|
| CN | 202067243 U | 12/2011 |
| CN | 103365450 A | 10/2013 |
| CN | 103530609 A | 1/2014 |
| CN | 103942481 A | 7/2014 |
| CN | 104049901 A | 9/2014 |
| CN | 203838717 U | 9/2014 |
| CN | 104318205 A | 1/2015 |
| CN | 104395907 A | 3/2015 |
| CN | 104881238 A | 9/2015 |
| CN | 204719733 U | 10/2015 |

\* cited by examiner

TOUCH DISPLAY DEVICE AND TOUCH METHOD THEREOF

TECHNICAL FIELD

Embodiments of the present disclosure relate to a touch display device and a touch method thereof.

BACKGROUND

Digital equipment has become indispensable in people's life and production. A display device, as an output terminal of video signals of the digital equipment, is used for directly transmitting information to operators and belongs to an essential device in the digital equipment. With the development of science and technology, the display device is not just limited to receive video signals for display but has the function of inputting control commands. That is to say, in a touch display device known by the inventor, direct command input via a screen can replace an auxiliary device for input, such as a keyboard, and provide better convenience for users.

However, the inventor has noticed that the touch operation is generally achieved by the determination of a finger touch position. Therefore, with the increasing functions of display devices, such as playing movie or music, logging in a communication tool, adjusting the image brightness, editing text and images, people need to touch a touch panel for a plurality of times in the process of achieving the above functions, so that a finger can touch positions corresponding to the above functions, and corresponding touch commands can be inputted. As a result, not only the user experience can be reduced due to complicated touch processes but also the service life of the touch panel can be reduced.

SUMMARY

Embodiments of the present disclosure provide a touch display device and a touch method thereof, which can solve problems of reduced user experience and reduced service life of products as the touch operation steps are complicated due to the addition of touch commands.

According to an aspect of present embodiments, a touch method of a touch display device is provided, which includes: acquiring a fingerprint information set including M first fingerprint images, where M≥1 and M is an integer; and inquiring M second fingerprint images matched with the M first fingerprint images in a preset information set according to the M first fingerprint images in the fingerprint information set, and acquiring S first control instructions corresponding to the M second fingerprint images, where 1≤S≤M and S is an integer. The preset information set includes fingerprint features of N second fingerprint images and corresponding relations between the N second fingerprint images and P first control instructions. The P first control instructions are different from each other, where 2≤P≤N, and N and P are integers.

In an example, before acquiring the fingerprint information set, the method further includes: acquiring the N second fingerprint images; performing image preprocessing on the N second fingerprint images; extracting a fingerprint feature from each second fingerprint image after preprocessing; and creating and storing the preset information set including the fingerprint features of the N second fingerprint images and the corresponding relations between the N second fingerprint images and P first control instructions.

In an example, the inquiring the M second fingerprint images matched with the M first fingerprint images in the preset information set and acquiring the S first control instructions corresponding to the M second fingerprint images further includes: performing image preprocessing on the M first fingerprint images; extracting a fingerprint feature from each first fingerprint image after preprocessing; comparing the fingerprint feature of each first fingerprint image with each of the fingerprint features of the N second fingerprint images; and acquiring a first control instruction corresponding to a second fingerprint image according to the corresponding relations between the N second fingerprint images and the P first control instructions when at least one of the M first fingerprint images matches with one of the N second fingerprint images.

In an example, the method further including: alarming when the M first fingerprint images and the N second fingerprint images do not match, respectively; and acquiring position information of the touch display device and sending the position information to a server when the number of alarming actions reaches a preset threshold.

In an example, the acquiring the fingerprint information set further includes acquiring a touch position of each of the M first fingerprint images; and the touch method further includes acquiring second control instructions according to the first control instructions and the touch positions; and the first control instructions are different from the second control instructions.

In an example, the touch display device includes a plurality of coupling capacitors including touch driving lines and touch sensing lines which are intersected with each other; and the acquiring the touch position of each of the first fingerprint images includes: applying touch driving signals to the touch driving lines; and allowing the plurality of coupling capacitors to be respectively connected with the touch driving lines and the touch sensing lines, and detecting the capacitance of each of the coupling capacitors. If the capacitance of one of the plurality of coupling capacitor changes abruptly, the position of the coupling capacitor is determined as the touch position of the first fingerprint image.

In an example, a touch display device is provided. The touch display device includes: a touch panel, a fingerprint collecting unit, a signal processing unit and a memory. The fingerprint collecting unit is connected with the touch panel and configured to acquire a fingerprint information set of a finger when the finger touches the touch panel, and fingerprint collecting unit is connected with the signal processing unit so as to send the fingerprint information set to the signal processing unit, in which the fingerprint information set includes M first fingerprint images, where M≥1, and M is an integer. The signal processing unit is further connected with the touch panel and the memory and configured to inquire M second fingerprint images matched with the M first fingerprint images in a preset information set in the memory according to the M first fingerprint images in the fingerprint information set, and acquire S first control instructions corresponding to the M second fingerprint images so as to output the first control instructions to the touch panel, where 1≤S≤M, and S is an integer. The preset information set includes fingerprint features of N second fingerprint images and corresponding relations between the N second fingerprint images and P first control instructions. The P first control instructions are different from each other, where 2≤P≤N, and N and P are integers.

In an example, the signal processing unit includes an instruction editor, an image processor, a feature comparator and an instruction trigger. The image processor is connected with the fingerprint collecting unit and the memory and configured to perform image preprocessing on the first fingerprint images acquired by the fingerprint collecting unit and the second fingerprint images in the memory, and extract the fingerprint features of the first fingerprint images and/or the second fingerprint images. The instruction editor is connected with the image processor and the memory and configured to obtain instruction match information by correlating the N second fingerprint images in the memory and the P first control instructions, and store the match information into the memory. The feature comparator is connected with the image processor and the memory and configured to compare a fingerprint feature of each of the first fingerprint images with each of the fingerprint features of the N second fingerprint images in the memory. The instruction trigger is connected with the feature comparator, the touch panel and the memory and configured to acquire a first control instruction corresponding to a second fingerprint image from the memory according to the corresponding relations between the N second fingerprint images and the P first control instructions when at least one of the M first fingerprint images matches with one of the second fingerprint images, and output the first control instruction to the touch panel, to allow the touch panel to display according to the first control instruction.

In an example, the signal processing unit further includes an alarm which is connected with the feature comparator and the touch panel and configured to send an alarm signal to the touch panel when the M first fingerprint images and the N second fingerprint images do not match, respectively, to allow the touch panel to display according to the alarm signal.

In an example, the touch display device further includes a touch sensor which is connected with the fingerprint collecting unit and the touch panel and configured to acquire a touch position of the first fingerprint images on the touch panel after the fingerprint collecting unit acquires the first fingerprint images.

BRIEF DESCRIPTION OF THE DRAWINGS

Simple description will be given below to the accompanying drawings required to be used in the embodiments or the prior art to provide a more clear understanding of the technical proposals of the embodiments of the present disclosure or the prior art. It is apparent that the accompanying drawings described below are only some embodiments of the present disclosure and other accompanying drawings may also be obtained by those skilled in the art without creative efforts on the basis of the accompanying drawings.

REFERENCE NUMERALS OF THE ACCOMPANYING DRAWINGS

10—touch panel; 20—finger collecting unit; 30—signal processing unit; 301—instruction editor; 302—image processor; 303—feature comparator; 304—instruction trigger; 305—alarm; 40—memory; 50—touch sensor.

DETAILED DESCRIPTION

Technical solutions according to the embodiments of the present disclosure will be described clearly and completely as below in conjunction with the accompanying drawings of embodiments of the present disclosure. It is apparent that the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "the," or the like, are not intended to limit the amount, but for indicating the existence of at lease one. The terms, such as "connect/connecting/connected," "couple/coupling/coupled" or the like, are not limited to a physical connection or mechanical connection, but may include an electrical connection/coupling, directly or indirectly. The terms, "on," "under," "left," "right" or the like are only used to indicate relative position relationship, and when the position of the object which is described is changed, the relative position relationship may be changed accordingly.

Figure 1:
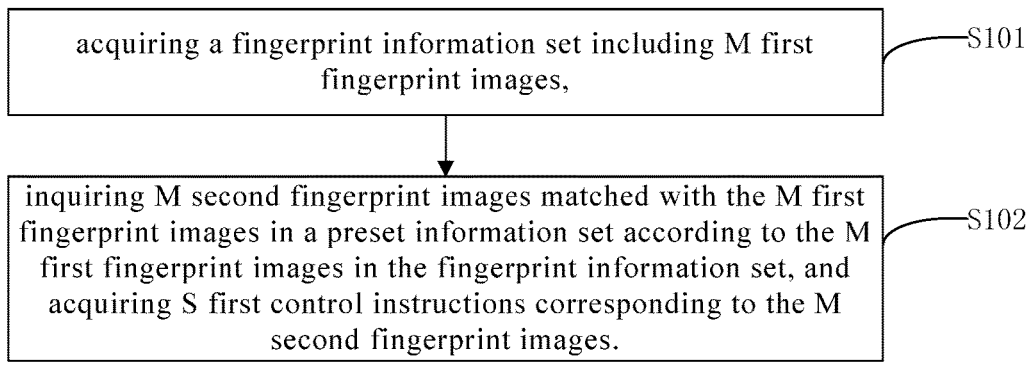
FIG. 1 is a flowchart of a touch method of a touch display device provided by an embodiment of the present disclosure.

Embodiments of the present disclosure provide a touch method of a touch display device. The touch display device refers to a display device which supports touch function. The touch method, as shown in FIG. 1, may include the following steps.

S101: acquiring a fingerprint information set including M first fingerprint images, where M≥1 and M is an integer.

S102: inquiring M second fingerprint images matched with the M first fingerprint images in a preset information set according to the M first fingerprint images in the fingerprint information set, and acquiring S first control instructions corresponding to the M second fingerprint images, where 1≤S≤M and S is an integer.

The preset information set includes fingerprint features of N second fingerprint images and corresponding relations between the N second fingerprint images and P first control instructions. The P first control instructions are different from each other, where 2≤P≤N; and N and P are integers.

It is noted that: firstly, the first fingerprint images and the second fingerprint images are fingerprint images collected by the touch display device in different stages via fingerprint collection. The second fingerprint images may be fingerprint images pre-stored into the touch display device. Pre-storing may be the storing of the second fingerprint images during the initialization of the touch display device; or as for some customized touch display devices, it may be the storing of the second fingerprint image before leaving factory in the manufacturing process; or a user may acquire the second fingerprint images and store information of the second fingerprint images (e.g., they may be the second fingerprint images and may also be fingerprint features of the second fingerprint images) through a setting interface with fingerprint touch function in the touch display device. In embodiments of the present disclosure, a user whose fingerprint images (namely the second fingerprint images) have been stored into the touch display device is referred to as a second user. In addition, a user whose fingerprints have not been input into the touch display device is referred to as a first user.

A first fingerprint image refers to a fingerprint image acquired by the touch display device in the process of using the touch display device after the fingerprint images of the second user have been stored. The first fingerprint image can be compared with one of the second fingerprint images which have been stored. In this way, the first fingerprint image and the one of the second fingerprint image may be same or different.

For instance, the first fingerprint image and the second fingerprint image may be same, e.g., it is a fingerprint of the same finger of the same user. In this way, the objective of calling a first control instruction corresponding to the second fingerprint image by the identification of the first fingerprint image can be achieved; or the first fingerprint image may be different from the second fingerprint image, which indicates that the fingerprint image of the user has not been pre-stored into the touch display device, so that the first fingerprint image of the user cannot be matched with any of the second fingerprint images stored in the touch display panel, and the first control instruction cannot be called. Therefore, a user without fingerprint recording (namely the fingerprint image of the user has not been pre-stored into the touch display device) cannot operate the touch display device.

Secondly, detailed description will be given below to the step of inquiring the M second fingerprint images matched with the M first fingerprint images in the preset information set and acquiring the S first control instructions corresponding to the M second fingerprint images, and to that the preset information set includes the fingerprint features of the N second fingerprint images and the corresponding relations between the N second fingerprint images and the P first control instructions.

When N and P are equal to each other, each second fingerprint image in the preset information set corresponds to a first control instruction, respectively. For instance, the preset information set may include second fingerprint images of five fingers of a right hand of a user and first control instructions corresponding to the second fingerprint images of the five fingers one to one. For instance, the first control instruction corresponding to the second fingerprint image of the little finger is DOUBLE CLICK; the first control instruction corresponding to the second fingerprint image of the ring finger is CLICK; the first control instruction corresponding to the second fingerprint image of the middle finger is UNDO; the first control instruction corresponding to the second fingerprint image of the forefinger is Chat Dialog Pop-Up; and the first control instruction corresponding to the second fingerprint image of the thumb is RETURN TO MAIN MENU.

In this case, M is equal to S. For instance, when M=1, S=1. For instance, the acquired fingerprint information set includes a first fingerprint image. When the first fingerprint image is the same as the second fingerprint image of the little finger, the first control instruction (DOUBLE CLICK) corresponding to the second fingerprint image of the little finger can be acquired.

When M=2, S=2. For instance, the acquired fingerprint information set includes two first fingerprint images. When the two first fingerprint images are respectively the same as the second fingerprint images of the little finger and the ring finger, the first control instruction (DOUBLE CLICK) corresponding to the second fingerprint image of the little finger and the first control instruction (CLICK) corresponding to the second fingerprint image of the ring finger can be respectively acquired.

Or, when P is less than N, at least two of the N second fingerprint images correspond to the same first control instruction.

For instance, the preset information set may include second fingerprint images of five fingers of a right hand of a user; the first control instruction corresponding to the second fingerprint images of the little finger and the ring finger is DOUBLE CLICK; the first control instruction corresponding to the second fingerprint images of the middle finger and the forefinger is UNDO; and the first control instruction corresponding to the second fingerprint image of the thumb is RETURN TO MAIN MENU.

In this case, M and S may be equal to each other. For instance, when M=1, S=1. For instance, the acquired fingerprint information set includes a first fingerprint image. When the first fingerprint image is the same as the second fingerprint image of the thumb, the first control instruction (RETURN TO MAIN MENU) corresponding to the second fingerprint image of the thumb can be acquired.

When M=2, S=2. For instance, the acquired fingerprint information set includes two first fingerprint images. When the two first fingerprint images are respectively the same as the second fingerprint images of the little finger and the thumb, the first control instruction (DOUBLE CLICK) corresponding to the second fingerprint image of the little finger and the first control instruction (RETUR TO MAIN MENU) corresponding to the second fingerprint image of the thumb can be respectively acquired.

In this way, M and S are equal to each other when at least two first fingerprint images are matched with at least two second fingerprint images in the preset fingerprint information set one to one and the first control instructions respectively corresponding to the at least two second fingerprint images are different, the first control instructions respectively corresponding to the second fingerprint images of the little finger and the thumb are different, for example.

In addition, S may also be less than M. When M=2, S=1. For instance, the acquired fingerprint information set includes two first fingerprint images. When the two first fingerprint images are respectively the same as the second fingerprint images of the little finger and the ring finger, the first control instruction (DOUBLE CLICK) corresponding to the second fingerprint images of the little finger and the ring finger can be acquired.

Therefore, S is less than M when at least two first fingerprint images are matched with at least two second fingerprint images in the preset fingerprint information set one to one and the first control instructions respectively corresponding to the at least two second fingerprint images are same, the first control instructions respectively corresponding to the second fingerprint images of the little finger and the ring finger are same, for example.

In this way, when two different second fingerprint images correspond to the same first control instruction, the first control instruction can be sent to the touch display device when both of the first fingerprint images which are the same as the two different second fingerprint images are acquired. For instance, when both of the first fingerprint images respectively corresponding to the little finger and the ring finger are acquired, the first control instruction (DOUBLE CLICK) corresponding to the second fingerprint images of the little finger and the ring finger can be sent to the touch display device. In this way, if the little finger and the ring finger respectively belong to different users, operation safety of the touch display device can be improved because the touch display device can only be operated when the above different staffs are present.

Or, the first control instruction can be sent to the touch display device when any first fingerprint image matched with the two different second fingerprint images is acquired. For instance, when any first fingerprint image corresponding to the little finger or the ring finger is acquired, the first control instruction (DOUBLE CLICK) corresponding to the second fingerprint image of the little finger or the ring finger can be sent to the touch display device. In this way, the inconvenience due to overcomplicated instructions can be avoided for a touch display device with low safety requirement.

The description is given above by taking the case that the preset information set includes fingerprints of the right hand of one user as an example. The preset information set may also include fingerprint images of a plurality of users. Embodiments of the present disclosure are not limited thereto.

The touch method of the touch display device, provided by the embodiments of the present disclosure, includes: firstly, acquiring a fingerprint information set including M first fingerprint images, where M≥1 and M is an integer; and secondly, inquiring M second fingerprint images matched with the M first fingerprint images in a preset information set according to the M first fingerprint images in the fingerprint information set, and acquiring S first control instructions corresponding to the M second fingerprint images, and triggering the first control instructions, where 1≤S≤M and S is an integer. The preset information set includes fingerprint features of N second fingerprint images and corresponding relations between the N second fingerprint images and P first control instructions; the P first control instructions are different from each other, where 2≤P≤N, and N and P are integers. In this way, fingerprint images of different fingers, namely the second fingerprint images, can be corresponded to different first control instructions one to one and pre-stored into the touch display device as the preset information set. Subsequently, a first fingerprint image in the fingerprint information set is acquired and compared with the pre-stored second fingerprint image. If the two fingerprint images are matched with each other, the first control instruction corresponding to the second fingerprint image can be triggered.

As the N second fingerprint images correspond to the P first control instructions, different first control instructions can be triggered by different fingers. The touch way is simplified, and the user experience is improved.

In order to improve the operation safety of the touch display device, fingerprints of users can be certified, so that uncertified users cannot operate the touch display device. In this instance, fingerprint images of users, namely the preset information set, must be pre-stored. Detailed description will be given below to the storing process of the preset information set before acquiring the fingerprint information set.

Figure 2:
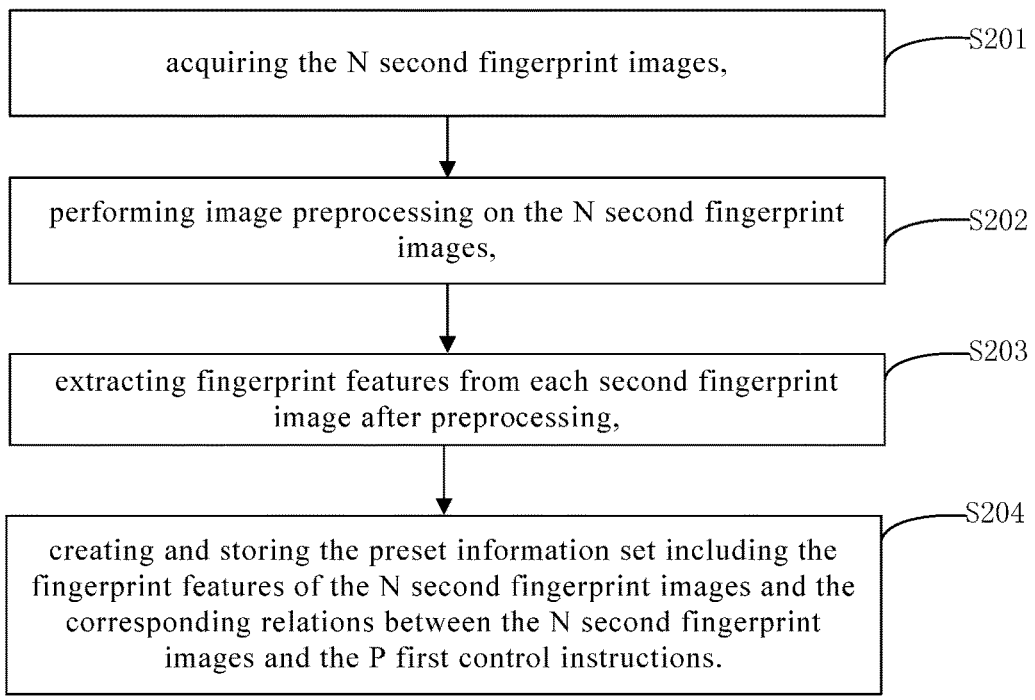
FIG. 2 is a flowchart of the touch method as shown in FIG. 1 before the step S101.

Before acquiring the fingerprint information set, as illustrated in FIG. 2, the touch method further includes the following steps.

S201: acquiring the N second fingerprint images.

As the surface of a finger is formed by convex ridges and concave valleys, the second fingerprint image of the finger can be drawn by identifying the ridges and the valleys.

Figure 3A:
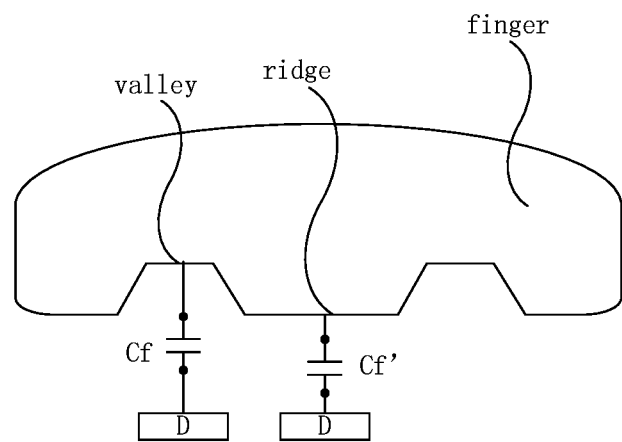
FIG. 3a is a schematic diagram illustrating the fingerprint acquisition process in an embodiment of the present disclosure.
Figure 3B:
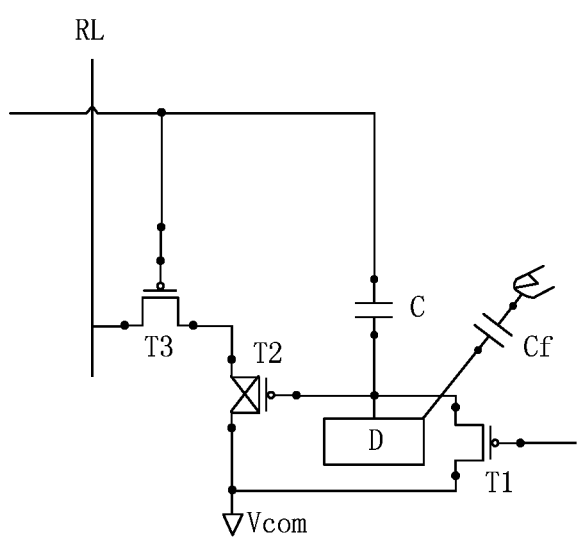
FIG. 3b is a schematic structural view of a fingerprint acquisition circuit in the process of acquiring valleys in an embodiment of the present disclosure.
Figure 3C:
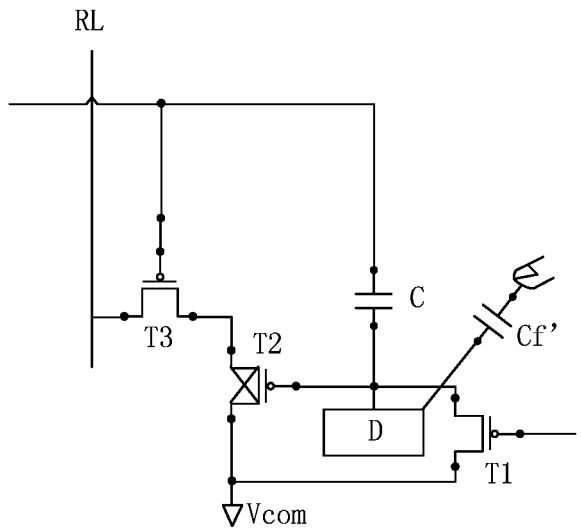
FIG. 3c is a schematic structural view of a fingerprint acquisition circuit in the process of acquiring ridges in the embodiment of the present disclosure.

As illustrated in FIG. 3b or 3c, a circuit for identifying a fingerprint may include a first transistor T1, a second transistor T2, a third transistor T3, a storage capacitor C and a detecting electrode D.

A first pole of the first transistor T1 is connected with a common voltage terminal Vcom, and a second pole is connected with a first end of the storage capacitor C. A gate electrode of the second transistor T2 is connected with the first end of the storage capacitor C; a first pole is connected with the common voltage terminal Vcom; and a second pole is connected with a first pole of the third transistor T3. A second pole of the third transistor T3 and a second end of the storage capacitor C are connected to a read signal line together. The detecting electrode D is connected with the first end of the storage capacitor C.

For instance, during the touch operation, as illustrated in FIG. 3a, coupling capacitance Cf may be formed between the valleys of the fingerprint and the detecting electrode D. The coupling capacitance Cf is small enough compared with the storage capacitance C as shown in FIG. 3b and the coupling capacitance Ct of the second transistor T2 as an amplifying transistor. In this way, the potential of the gate electrode of the second transistor T2 can be increased. If the second transistor T2 is a P-type transistor, the second transistor T2 will be in "off" state. At this point, the second pole of the second transistor T2 produces initial current signal.

Or, during the touch operation, as illustrated in FIG. 3a, coupling capacitance Cf is formed between the ridges of the fingerprint and the detecting electrode D. The coupling capacitance Cf is large enough compared with the storing capacitance C as shown in FIG. 3c and the coupling capacitance Ct of the second transistor T2 per se as an amplifying transistor. In this way, the potential of the gate electrode of the second transistor T2 can be reduced. If the second transistor T2 is a P-type transistor, the second transistor T2 will be in "on" state. Therefore, the signal of the common voltage terminal Vcom will be amplified through the second transistor T2.

The storage capacitance C and the coupling capacitance Ct of the second transistor T2 as the amplifying transistor shall be between the coupling capacitance Cf formed between the valleys of the fingerprint and the detecting electrode D and the coupling capacitance Cf formed between the ridges of the fingerprint and the detecting electrode D.

In this case, when the second pole of the second transistor T2 produces initial current signal, fingerprint information acquired through the read signal line RL is the valleys of the fingerprint; and when the second pole of the second transistor T2 produces amplified signal, the fingerprint information acquired through the read signal line RL is the ridges of the fingerprint. In this way, the second fingerprint image of the finger can be generated by collecting the valleys and the ridges of the finger. Embodiments of the present disclosure are not limited to above ways, any other ways for acquiring the fingerprint image can be used in the embodiments of the present disclosure.

S202: performing image preprocessing on the N second fingerprint images.

As the original fingerprint image obtained through the step S201 normally will have a lot of noise, broken lines, blurred lines or the like, image preprocessing is needed to improve the quality.

Image preprocessing, for instance, may include filter de-noising (primary smoothing) which mainly remove some discrete and isolated high-contrast dots in the original fingerprint image on the premise of maintaining line edges in the image as much as possible and avoiding possible calculation and analysis errors in the subsequent image processing process, and may also eliminate many tiny defects on ridges caused by image noise in the fingerprint image as much as possible; sharpening (secondary smoothing); dynamic binaryzation which converts a fingerprint image with texture gray-scale variation into a two-tone fingerprint image in white and black, in which due to binaryzation operation, in the fingerprint gray scale, valley portions with relatively light tone are converted into white and ridge portions with relatively deep tone are converted into black; and refinement (including processes, such as direction information calculation, initial classification, background segmentation and line interval estimation) which is to obtain a pattern which has similar shape to the original fingerprint image and includes simple arcs or curves. An objective of image preprocessing is to improve the quality of the inputted original fingerprint image and improve the accuracy in the extracting fingerprint features in the following step S203.

S203: extracting fingerprint features from each second fingerprint image after preprocessing.

The basic line pattern of the fingerprint includes loop-shaped line, arc-shaped line and whorl-shaped line. The above basic line patterns are not continuous, smooth and straight but are often broken, forked or bent. Some fingerprint feature points, such as center points, trigonometrical points, end points and cross points, will be presented at broken, forked or bent positions. The fingerprint feature points have the characteristics of lifelong invariance and uniqueness and constitute unique confirmation information of the fingerprint. In this way, the extraction of the fingerprint features from each second fingerprint image after preprocessing is to extract the above fingerprint feature points.

S204: creating and storing the preset information set including the fingerprint features of the N second fingerprint images and the corresponding relations between the N second fingerprint images and the P first control instructions.

As described above, when N and P are equal to each other, the N second fingerprint images correspond to the P first control instructions one to one. When N and P are not equal to each other, at least two second fingerprint images correspond to a first control instruction.

The recording process of a user's fingerprints can be achieved by the above steps. In this way, in the subsequent touch process, non-entry staff (those whose fingerprints have not been recorded through the above steps) cannot operate the touch display device.

Figure 4:
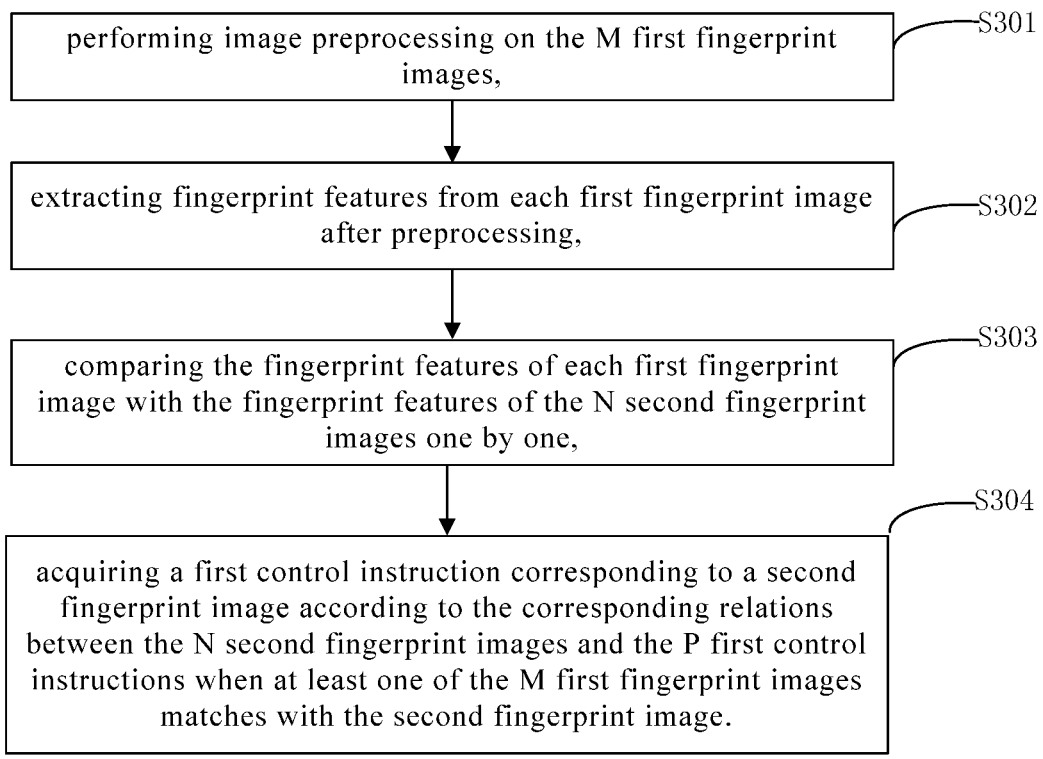
FIG. 4 is a flowchart of detailed steps of the step S102 in FIG. 1.

After the recording process of the user fingerprints is stopped, when the touch display device is touched, a user's fingerprint must be certified so as to ensure that those capable of touching or operating the touch display device are all entry staff (those whose fingerprints have been recorded through the steps S201 to S204). For instance, as illustrated in FIG. 4, the certification touch display process, namely the step S102, includes the following steps.

S301: performing image preprocessing on the M first fingerprint images.

For instance, the principle of the image preprocessing process is the same as that of the step S202, and both are to improve the quality of the original first fingerprint image so as to improve the accuracy in the extraction of fingerprint features in the following step S302.

S302: extracting fingerprint features from each first fingerprint image after being preprocessed.

For instance, the principle of the extraction of the fingerprint features is the same as that of the step S203, and both are to obtain unique fingerprint feature points, such as center points, trigonometrical points, end points and cross points.

S303: comparing the fingerprint features of each first fingerprint image with the fingerprint features of the N second fingerprint images one by one.

That is to say, the degree of similarity of the fingerprint features of each first fingerprint image and the fingerprint features of the N second fingerprint images which have been stored into the touch display device is compared. The degree of similarity may be represented by a cost function (or matching energy). Whether the above two fingerprint features belong to the same finger is determined by selecting an appropriate threshold. The method of feature comparison includes minimum distance method, triangulation algorithm, and the like. The above threshold is used for determining the cut-off value of the degree of similarity of the two fingerprint features. The higher the threshold is, the higher the requirement to the similarity is.

S304: acquiring a first control instruction corresponding to a second fingerprint image according to the corresponding relations between the N second fingerprint images and the P first control instructions when at least one of the M first fingerprint images matches with the second fingerprint image.

For instance, when at least one of the M first fingerprint images matches with a second fingerprint image, such as the second fingerprint image of the little finger, the first control instruction, such as DOUBLE CLICK, corresponding to the second fingerprint image of the little finger can be acquired according to instruction matching information of the second fingerprint image of the little finger.

It is possible that only a user passed through the fingerprint certification can control the touch display device by the above steps. The operation safety of the touch display device can be improved.

In addition, an alarm is produced when the M first fingerprint images are respectively not matched with the N second fingerprint images. That the M first fingerprint images are respectively not matched with the N second fingerprint images refers to that the preset information set does not include any second fingerprint image which can match with the first fingerprint image.

For instance, when the first user operates the touch display device, as the fingerprint images of the first user have not been input or recorded into the touch display device through the steps S201 to S204, the fingerprint images of the first user cannot be matched with the fingerprint images which have been recorded into the touch display device. At this point, the touch display device can alarm to inform the first user of touch failure. When the number of alarms reaches a preset threshold, the position information of the touch display device can be acquired via a global positioning system (GPS) and sent to a server, so that a second user (one of those whose fingerprint images have been recorded into the touch display device) of the touch display device can acquire the alarm information.

It is noted that the server may be a server of other devices of the second user, such as a server of mobile phones and portable computers, or may be a cloud server which is bound with the identify information of the second user. But the embodiments of the present disclosure are not limited thereto, it may be any other servers through which the second user can acquire the above alarm information.

With the continuous improvement of the technology of the touch display device, the touch display device is not just limited to display images or pictures but may also edit text and images. In this way, at different positions in the same display interface, even the same first control instruction may require the touch display device to execute different operations. In this way, the step of acquiring the fingerprint information set further includes the step of acquiring the touch position of the first fingerprint image. The touch method further includes the step of acquiring the second control instruction according to the first control instruction and the touch position, in which the first control instruction is different from the second control instruction.

For instance, when the touch display device is adopted for drawing, if double click (the first control instruction) is performed on an icon in the top right corner of the drawing interface, the entire interface can be amplified (the second control instruction); and when double click (the first control instruction) is performed on an icon in the middle of the drawing interface, an operation of inserting a straight line (the second control instruction) can be executed.

In this way, the second fingerprint image matched with the first fingerprint image can be inquired from the preset information set according to the acquired first fingerprint image, and the first control instruction, such as DOUBLE CLICK, corresponding to the second fingerprint image can also be acquired. Subsequently, according to the position information of the acquired first fingerprint image, e.g., when the touch position is an amplifying icon in the top right corner of the drawing interface, the amplifying operation as the second control instruction is acquired.

In this case, the position of the finger must also be determined in order to satisfy the requirement of executing different operations at different positions by the same first control instruction.

Figure 5:
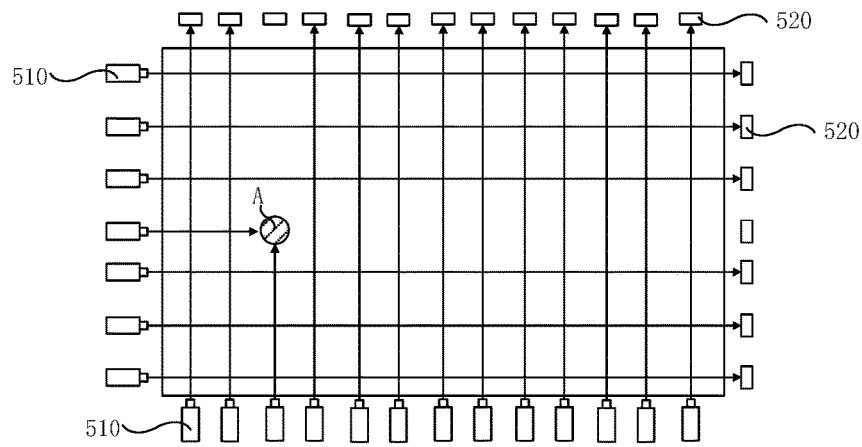
FIG. 5 is a schematic structural view of a circuit for detecting the touch position by infrared technology in an embodiment of the present disclosure.

On this basis, the touch position may be detected by infrared technology. As illustrated in FIG. 5, infrared light-emitting diodes (LEDs) 510 are disposed on two adjacent sides of the display screen in an array and photo diodes (PDs) 520 are respectively disposed on opposite sides of the LEDs 510. When a LED 510 is switched on, a PD 520 detects a signal of the LED 510. When a user touches an A point as shown in FIG. 5 of the touch display device, an infrared signal emitted by the LED 510 will be blocked, so that the PD 520 arranged opposite to the LED 510 cannot receive the infrared signal, so the touch position can be identified by the signal blocking position.

On this basis, light of a single LED 510 may also be coupled to a plurality of optical waveguides through optical waveguide technology. Each waveguide is taken as a light-emitting source and the received light is coupled into a single PD 520 again through the plurality of waveguides. Therefore, the number of the LEDs 510 and the PDs 520 can be greatly reduced.

In addition, the touch display device may be divided into out-cell mode and in-cell mode in view of configuration. The out-cell mode is that a touch component and a display screen are produced separately and bonded together to form a display with touch function. For an in-cell touch display device, the finger touch position can be detected on the basis of the mutual-capacitance or self-capacitance principle. Description will be given below to the detection of the finger touch position by taking a mutual-capacitance touch display device as an example.

Figure 6:
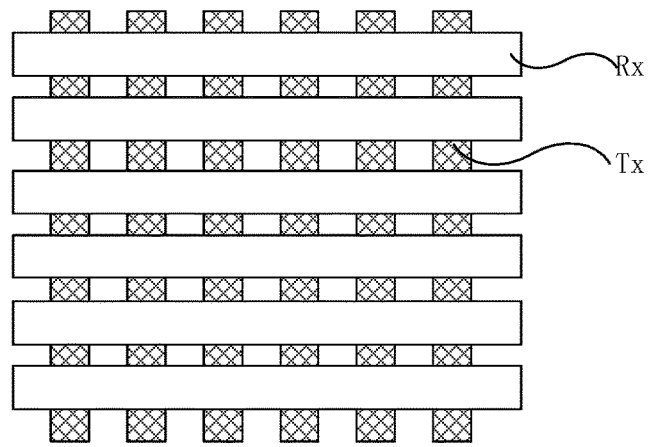
FIG. 6 is a schematic structural view of a mutual-capacitance touch display device provided by an embodiment of the present disclosure.
Figure 7:
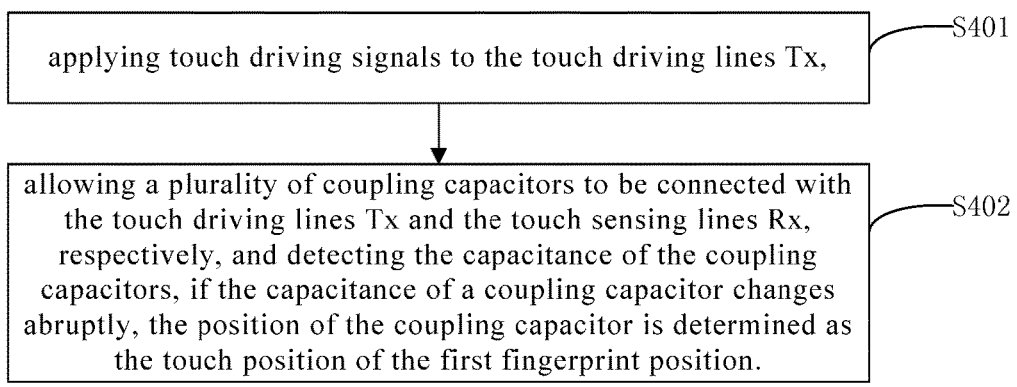
FIG. 7 is a flowchart of a touch position detection method of the mutual-capacitance touch display device as shown in FIG. 6.

For instance, the touch display device includes a plurality of coupling capacitors. The plurality of coupling capacitors, as shown in FIG. 6, include a plurality of touch driving lines Tx and touch sensing lines Rx which are intersected with each other. As illustrated in FIG. 7, the method of acquiring the touch position of the first fingerprint image may include the following steps.

S401: applying touch driving signals to the touch driving lines Tx.

For instance, in order to avoid the mutual interference between display signals and touch signals of the touch display device, display driving and touch driving can be performed separately in different time. For instance, the touch driving can be performed on blanking time after one frame is ended and before the next frame begins, so as to apply a touch driving signal to the touch driving lines Tx.

S402: allowing the plurality of coupling capacitors to be connected with the touch driving lines Tx and the touch sensing lines Rx, respectively, and detecting the capacitance of the coupling capacitors. If the capacitance of a coupling capacitor changes abruptly, the position of the coupling capacitor is determined as the touch position of the first fingerprint position.

The touch position of the first fingerprint image can be acquired by the above steps. In this way, the same first control instruction can execute different operations at different positions. The foregoing is only an illustrative example of the detection of the finger touch position. Other detection ways, such as ultrasonic ways and optical ways, will not be further described in detail but shall fall within the scope of the present disclosure.

In this way, the touch method provided by the embodiments of the present disclosure can identify the fingerprint of the finger and detect the touch position of the finger.

Figure 8:
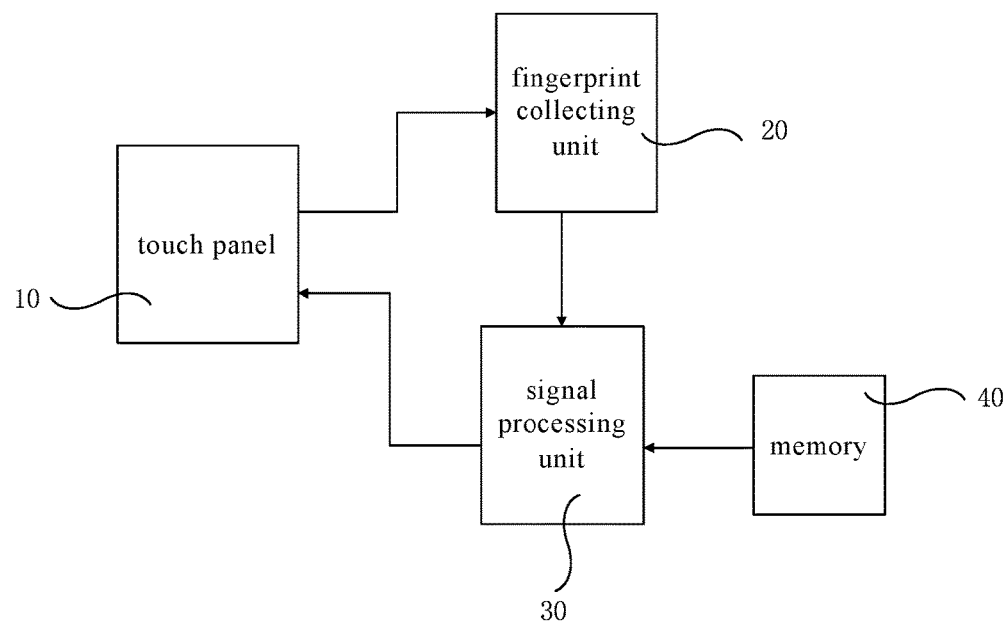
FIG. 8 is a schematic structural view of a touch display device provided by an embodiment of the present disclosure.

An embodiment of the present disclosure provides a touch display device. As illustrated in FIG. 8, the touch display device may include a touch panel 10, a fingerprint collecting unit 20, a signal processing unit 30 and a memory 40.

The fingerprint collecting unit 20 is connected with the touch panel 10 and configured to acquire a fingerprint information set of a finger when the finger touches the touch panel 10, and is connected with the signal processing unit 30 so as to send the fingerprint information set to the signal processing unit 30. The fingerprint information set includes M first fingerprint images, where M≥1 and M is an integer.

The signal processing unit 30 is further connected with the touch panel 10 and the memory 40 and configured to inquire M second fingerprint images matched with the M first fingerprint images in a preset information set in the memory 40 according to the M first fingerprint images in the fingerprint information set, and acquire S first control instructions corresponding to the M second fingerprint images so as to output the S first control instructions to the touch panel 10, where 1≤S≤M and S is an integer.

The preset information set includes fingerprint features of N second fingerprint images and corresponding relations between the N second fingerprint images and P first control instructions; and the P first control instructions are different from each other, where 2≤P≤N and N and P are integers.

It is noted that the touch panel 10 may be an out-cell touch panel or an in-cell touch panel, but embodiments of the present disclosure are not limited thereto.

The touch display device provided by the embodiment of the present disclosure includes a touch panel, a fingerprint collecting unit, a signal processing unit and a memory. The fingerprint collecting unit is configured to acquire M first fingerprint images in a fingerprint information set of fingers, where M≥1 and M is an integer. The signal processing unit is configured to inquire M second fingerprint images matched with the M first fingerprint images in a preset information set in the memory according to the fingerprint information set, and acquire S first control instructions corresponding to the M second fingerprint images, where 1≤S≤M and S is an integer. In this way, fingerprint images of different fingers, namely the second fingerprint images, can be correlated with different first control instructions one to one through the signal processing unit and pre-stored into the memory as the preset information set. The first fingerprint image in the fingerprint information set is acquired by the fingerprint collecting unit and compared with the pre-stored second fingerprint image through the signal processing unit. If the two fingerprint images matches with each other, the first control instruction corresponding to the second fingerprint image can be triggered. As the N second fingerprint images correspond to the P first control instructions, different fingers can trigger different first control instructions. The touch approach is simplified, and the user experience is improved.

Figure 9:
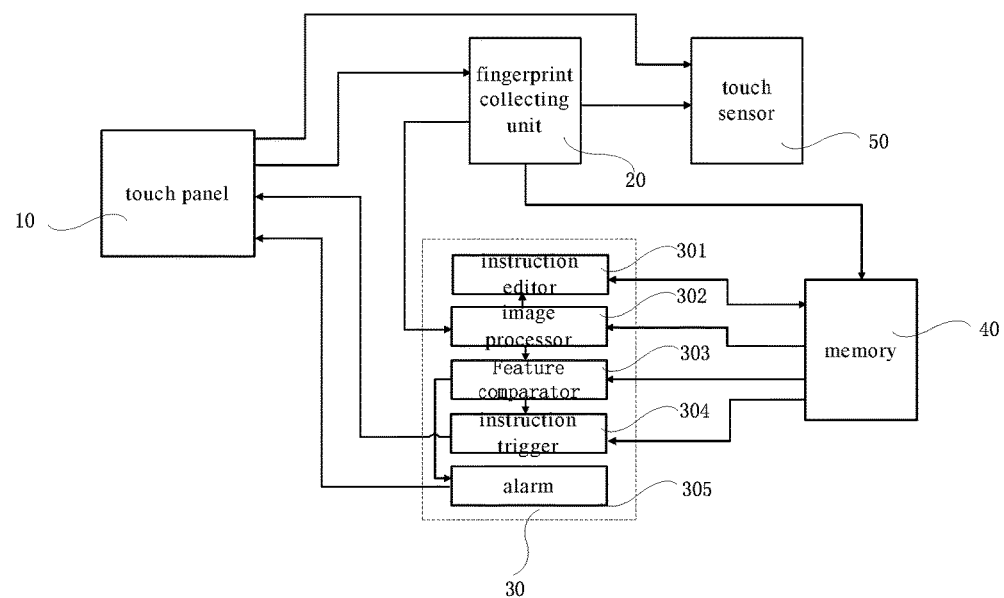
FIG. 9 is a schematic structural view of another touch display device provided by an embodiment of the present disclosure.

Moreover, as illustrated in FIG. 9, the signal processing unit 30 may include an instruction editor 301, an image processor 302, a feature comparator 303 and an instruction trigger 304.

The image processor 302 is connected with the fingerprint collecting unit 20 and the memory 40 and configured to perform image preprocessing on the first fingerprint images acquired by the fingerprint collecting unit 20 and the second fingerprint images in the memory 40, and extract the fingerprint features of the first fingerprint images and/or the second fingerprint images.

For instance, image preprocessing may include filter de-noising (primary smoothing) which mainly has the function of removing some discrete and isolated high-contrast dots in the original fingerprint image on the premise of maintaining line edges in the image as much as possible and avoiding possible calculation and analysis errors in the subsequent image processing process, while it may also eliminate many tiny defects on ridges, caused by image noise, in the fingerprint image as much as possible; sharpening (secondary smoothing); dynamic binaryzation which converts a fingerprint image with texture gray-scale variation into a two-tone fingerprint image in white and black, in which due to the binaryzation processing, in the fingerprint gray scale, valley portions with relatively light tone are converted into white and ridge portions with relatively deep tone are converted into black; and refinement (including processes, such as direction information calculation, initial classification, background segmentation, and line interval estimation) which is to obtain a pattern which has similar shape with the original fingerprint image and includes simple arcs or curves. An objective of the image preprocessing is to improve the quality of the inputted original fingerprint image and improve the accuracy in the extraction of the fingerprint features.

The basic line pattern of the fingerprint includes loop-shaped line, arc-shaped line and whorl-shaped line. The above basic line patterns are not continuous, smooth and straight but are often broken, crossed or bent. Some fingerprint feature points, such as center points, trigonometrical points, end points and cross points, will be presented at broken, crossed or bent positions. The fingerprint feature points have the characteristics of lifelong invariance and uniqueness and constitute unique confirmation information of the fingerprint. In this way, the extraction of the fingerprint features from each second fingerprint image after preprocessing is to extract the above fingerprint feature points.

The instruction editor 301 is connected with the image processor 302 and the memory 40 and configured to obtain instruction match information by correlating the N second fingerprint images in the memory 40 with the P first control instructions, and store the match information into the memory 40.

The feature comparator 303 is connected with the image processor 302 and the memory 40 and configured to allow the fingerprint features of each first fingerprint image being matched with the fingerprint features of the N second fingerprint images in the memory 40 one to one.

That is to say, the degree of similarity of the fingerprint features of each first fingerprint image and the fingerprint features of the N second fingerprint images which have been stored into the touch display device is compared. The degree of similarity may be represented by a cost function (or matching energy). Whether the above two fingerprint features belong to the same finger is determined by selecting an appropriate threshold. The method of feature comparison includes minimum distance graph method, and triangulation algorithm, and the like. The above threshold is used for determining the cut-off value of the degree of similarity of the two fingerprint features. The higher the threshold is, the higher the requirement to the similarity.

The instruction trigger 304 is connected with the feature comparator 303, the touch panel 10 and the memory 40 and configured to acquire a first control instruction corresponding to a second fingerprint image from the memory 40 according to the corresponding relations between the N second fingerprint images and the P first control instructions when at least one of the M first fingerprint images matches with the second fingerprint image, and output the first control instruction to the touch panel 10, so that the touch panel 10 can display according to the first control instruction.

For instance, when at least one of the M first fingerprint images is matched with a second fingerprint image, such as the second fingerprint image of the little finger, a first control instruction, such as DOUBLE CLICK, corresponding to the second fingerprint image of the little finger can be acquired according to instruction matching information of the second fingerprint image of the little finger. In this case, the double click instruction can be triggered.

It is possible that only a user passed through the fingerprint certification can control the touch display device by the various components of the signal processing unit. The operation safety of the touch display device can be improved.

In addition, the signal processing unit 30 may further include an alarm 305 which is connected with the feature comparator 303 and the touch panel 10 and configured to send an alarm signal to the touch panel 10 when the M first fingerprint images do not match with the N second fingerprint images, respectively, so that the touch panel 10 can display according to the alarm signal. For instance, when a first user operates the touch display device, as the fingerprint images of the first user have not been stored into the memory 40, the fingerprint images of the first user cannot be matched with the fingerprint images which have been stored into the memory 40. At this point, the alarm 305 can alarm, and an alarm image is displayed on the touch panel 10 to inform the first user of touch failure. When the number of alarms reaches a preset threshold, the position information of the touch display device can be acquired via a GPS and sent to a server, so that a second user (one of those whose fingerprint images have been stored into the memory 40) of the touch display device can acquire the alarm information.

Moreover, with the continuous improvement of the technology of the touch display device, the touch display device is not just limited to display images or pictures but may also edit text and images. In this way, at different positions in the same display interface, even the same first control instruction may require the touch display device to execute different operations. For instance, when the touch display device is adopted for drawing, if double click is performed in the top right corner of the drawing interface, the entire interface can be amplified; and when double click is performed in the middle of the drawing interface, an operation of inserting a straight line can be executed. Therefore, the position of the finger is also needed to be determined in order to satisfy the requirement of executing different operations at different positions by the same first control instruction.

In this case, the touch display device further includes a touch sensor 50 which is connected with the fingerprint collecting unit 20 and the touch panel 10 and configured to acquire the touch position of the first fingerprint image on the touch panel 10 after the first fingerprint image is acquired by the fingerprint collecting unit 20. The touch sensor 50 may be an infrared sensor, an optical sensor, an ultrasonic sensor, a capacitive sensor, or the like.

It is noted that the touch sensor 50 acquires the touch position of the first fingerprint image on the touch panel 10 after the fingerprint collecting unit 20 acquires the first fingerprint image. In this way, the signal interference between the fingerprint collecting unit 20 and the touch sensor 50 when the touch sensor 50 and the fingerprint collecting unit 20 operate at the same time can be avoided.

The above embodiments are only used for describing the embodiments of the present disclosure but not intended to limit the present disclosure. Various changes and modifications may be made by an ordinary skill in the art without departing from the spirit and the scope of the present disclosure. Therefore, all the equivalent technical proposals shall also fall within the scope of the present disclosure. The scope of the present disclosure shall be defined by the appended claims.

What is claimed is:

1. A touch method of a touch display device, comprising:
providing the touch display device, wherein the touch display device comprises a touch panel, a fingerprint collecting unit connected with the touch panel, a signal processing unit connected with the fingerprint collecting unit, and a memory connected with the signal processing unit; wherein signal processing unit includes an instruction editor, an image processor, a feature comparator and an instruction trigger,
acquiring a fingerprint information set including M first fingerprint images by the fingerprint collecting unit, where M≥1 and M is an integer, and
inquiring M second fingerprint images matched with the M first fingerprint images in a preset information set according to the M first fingerprint images in the fingerprint information set in the memory by the signal processing unit, and acquiring S first control instructions corresponding to the M second fingerprint images from the memory, where 1≤S≤M and S is an integer;
wherein the preset information set in the memory includes fingerprint features of N second fingerprint images and corresponding relations between the N second fingerprint images and P first control instructions; and the P first control instructions are different from each other, where 2≤P≤N, and N and P are integers.

2. The touch method of the touch display device according to claim 1, wherein before acquiring the fingerprint information set, the method further comprises:
acquiring the N second fingerprint images from the memory;
performing image preprocessing on the N second fingerprint images by the image processor;
extracting a fingerprint feature from each second fingerprint image after the preprocessing by the image processor; and
creating and storing the preset information set including the fingerprint features of the N second fingerprint images and the corresponding relations between the N second fingerprint images and P first control instructions by the instruction editor.

3. The touch method of the touch display device according to claim 2, wherein inquiring the M second fingerprint images matched with the M first fingerprint images in the preset information set and acquiring the S first control instructions corresponding to the M second fingerprint images further includes:
performing image preprocessing on the M first fingerprint images;
extracting a fingerprint feature from each first fingerprint image after preprocessing;
comparing the fingerprint feature of each first fingerprint image with each of the fingerprint features of the N second fingerprint images; and
acquiring a first control instruction corresponding to a second fingerprint image according to the corresponding relations between the N second fingerprint images and the P first control instructions when at least one of the M first fingerprint images matches with one of the N second fingerprint images.

4. The touch method of the touch display device according to claim 3, further comprising:
alarming when the M first fingerprint images and the N second fingerprint images do not match, respectively; and
acquiring position information of the touch display device and sending the position information to a server when a number of alarming actions reaches a preset threshold.

5. The touch method of the touch display device according to claim 4, wherein acquiring the fingerprint information set further includes acquiring a touch position of each of the M first fingerprint images; and
the touch method further comprises acquiring second control instructions according to the first control instructions and the touch positions; and the first control instructions are different from the second control instructions.

6. The touch method of the touch display device according to claim 5, wherein the touch display device comprises a plurality of coupling capacitors including touch driving lines and touch sensing lines which are intersected with each other; and acquiring the touch position of each of the first fingerprint images includes:
applying touch driving signals to the touch driving lines; and
allowing the plurality of coupling capacitors to be respectively connected with the touch driving lines and the touch sensing lines, and
detecting the capacitance of each of the coupling capacitors, wherein if the capacitance of one of the plurality of coupling capacitor changes abruptly, the position of the coupling capacitor is determined as the touch position of the first fingerprint image.

7. The touch method of the touch display device according to claim 2, further comprising:
alarming when the M first fingerprint images and the N second fingerprint images do not match, respectively; and
acquiring position information of the touch display device and sending the position information to a server when a number of alarming actions reaches a preset threshold.

8. The touch method of the touch display device according to claim 2, wherein acquiring the fingerprint information set further includes acquiring a touch position of each of the M first fingerprint images; and
the touch method further comprises acquiring second control instructions according to the first control instructions and the touch positions; and the first control instructions are different from the second control instructions.

9. The touch method of the touch display device according to claim 2, wherein the touch display device comprises a plurality of coupling capacitors including touch driving lines and touch sensing lines which are intersected with each other; and acquiring the touch position of each of the first fingerprint images includes:
applying touch driving signals to the touch driving lines; and
allowing the plurality of coupling capacitors to be respectively connected with the touch driving lines and the touch sensing lines, and
detecting the capacitance of each of the coupling capacitors, wherein if the capacitance of one of the plurality of coupling capacitor changes abruptly, the position of the coupling capacitor is determined as the touch position of the first fingerprint image.

10. The touch method of the touch display device according to claim 1, wherein inquiring the M second fingerprint images matched with the M first fingerprint images in the preset information set in the memory by the signal processing unit and acquiring the S first control instructions corresponding to the M second fingerprint images from the memory further includes:
performing image preprocessing on the M first fingerprint images by the image processor;
extracting a fingerprint feature from each first fingerprint image after preprocessing by the image processor;
comparing the fingerprint feature of each first fingerprint image with each of the fingerprint features of the N second fingerprint images by the feature comparator; and
acquiring a first control instruction corresponding to a second fingerprint image according to the corresponding relations between the N second fingerprint images and the P first control instructions when at least one of the M first fingerprint images matches with one of the N second fingerprint images by the instruction trigger.

11. The touch method of the touch display device according to claim 1, further comprising:
alarming when the M first fingerprint images and the N second fingerprint images do not match, respectively, by an alarm; and
acquiring position information of the touch display device by a global positioning system and sending the position information to a server when a number of alarming actions reaches a preset threshold.

12. The touch method of the touch display device according to claim 1, wherein acquiring the fingerprint information set further includes acquiring a touch position of each of the M first fingerprint images by a touch sensor connected with the fingerprint collecting unit and the touch panel; and
the touch method further comprises acquiring second control instructions according to the first control instructions and the touch positions; and the first control instructions are different from the second control instructions.

13. The touch method of the touch display device according to claim 1, wherein the touch display device comprises a plurality of coupling capacitors including touch driving lines and touch sensing lines which are intersected with each other; and acquiring the touch position of each of the first fingerprint images includes:
applying touch driving signals to the touch driving lines; and
allowing the plurality of coupling capacitors to be respectively connected with the touch driving lines and the touch sensing lines, and
detecting the capacitance of each of the coupling capacitors, wherein if the capacitance of one of the plurality of coupling capacitor changes abruptly, the position of the coupling capacitor is determined as the touch position of the first fingerprint image.

14. A touch display device, comprising: a touch panel, a fingerprint collecting unit, a signal processing unit and a memory, wherein
the fingerprint collecting unit is connected with the touch panel and configured to acquire a fingerprint information set of a finger when the finger touches the touch panel, and the fingerprint collecting unit is connected with the signal processing unit so as to send the fingerprint information set to the signal processing unit, in which the fingerprint information set includes M first fingerprint images, where M≥1, and M is an integer; and
the signal processing unit is further connected with the touch panel and the memory and configured to inquire M second fingerprint images matched with the M first fingerprint images in a preset information set in the memory according to the M first fingerprint images in the fingerprint information set, and acquire S first control instructions corresponding to the M second fingerprint images so as to output the first control instructions to the touch panel, where 1≤S≤M, and S is an integer; wherein the preset information set includes fingerprint features of N second fingerprint images and corresponding relations between the N second fingerprint images and P first control instructions; and the P first control instructions are different from each other, where $2 \leq P \leq N$, and N and P are integers.

15. The touch display device according to claim 14, wherein the signal processing unit includes an instruction editor, an image processor, a feature comparator and an instruction trigger;

the image processor is connected with the fingerprint collecting unit and the memory and configured to perform image preprocessing on the first fingerprint images acquired by the fingerprint collecting unit and the second fingerprint images in the memory, and extract the fingerprint features of the first fingerprint images and/or the second fingerprint images;

the instruction editor is connected with the image processor and the memory and configured to obtain instruction match information by correlating the N second fingerprint images in the memory and the P first control instructions, and store the match information into the memory;

the feature comparator is connected with the image processor and the memory and configured to compare a fingerprint feature of each of the first fingerprint images with each of the fingerprint features of the N second fingerprint images in the memory; and the instruction trigger is connected with the feature comparator, the touch panel and the memory and configured to acquire a first control instruction corresponding to a second fingerprint image from the memory according to the corresponding relations between the N second fingerprint images and the P first control instructions when at least one of the M first fingerprint images matches with one of the second fingerprint images, and output the first control instruction to the touch panel, to allow the touch panel to display according to the first control instruction.

16. The touch display device according to claim 15, wherein the signal processing unit further includes an alarm which is connected with the feature comparator and the touch panel and configured to send an alarm signal to the touch panel when the M first fingerprint images and the N second fingerprint images do not match, respectively, to allow the touch panel to display according to the alarm signal.

17. The touch display device according to claim 16, further comprising a touch sensor which is connected with the fingerprint collecting unit and the touch panel and configured to acquire a touch position of the first fingerprint images on the touch panel after the fingerprint collecting unit acquires the first fingerprint images.

18. The touch display device according to claim 14, wherein the signal processing unit further includes an alarm which is connected with the feature comparator and the touch panel and configured to send an alarm signal to the touch panel when the M first fingerprint images and the N second fingerprint images do not match, respectively, to allow the touch panel to display according to the alarm signal.

19. The touch display device according to claim 14, further comprising a touch sensor which is connected with the fingerprint collecting unit and the touch panel and configured to acquire a touch position of the first fingerprint images on the touch panel after the fingerprint collecting unit acquires the first fingerprint images.

* * * * *